United States Patent
Chen et al.

(10) Patent No.: US 8,041,024 B2
(45) Date of Patent: Oct. 18, 2011

(54) METHOD AND SYSTEM FOR TELEPHONE NUMBER CHANGE NOTIFICATION AND TRACKING

(75) Inventors: Yen-Fu Chen, Austin, TX (US); Fabian F. Morgan, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1211 days.

(21) Appl. No.: 11/550,167

(22) Filed: Oct. 17, 2006

(65) Prior Publication Data
US 2008/0089487 A1   Apr. 17, 2008

(51) Int. Cl.
*H04W 4/00* (2009.01)
*H04M 1/00* (2006.01)

(52) U.S. Cl. ........... 379/355.02; 379/88.12; 379/201.04; 379/207.02; 379/213.01; 379/356.01; 455/41.5; 455/412.2; 455/418; 455/466; 455/556.2; 455/566

(58) Field of Classification Search .................. 455/411, 455/566, 466, 556.2, 418, 412.2, 41.2; 379/88.11, 379/88.12, 355.02, 213.01, 201.04, 207.02, 379/356.01
See application file for complete search history.

(56) References Cited

U.S. PATENT DOCUMENTS

| | | | |
|---|---|---|---|
| 4,788,715 A | 11/1988 | Lee | |
| 5,012,510 A | 4/1991 | Schaubs et al. | |
| 5,732,132 A | 3/1998 | Hamada | |
| 5,832,061 A | 11/1998 | Rubin | |
| 5,875,240 A | 2/1999 | Silverman | |
| 5,903,642 A | 5/1999 | Schwartz et al. | |
| 6,049,601 A | 4/2000 | Orui | |
| 6,070,241 A | 5/2000 | Edwards et al. | |
| 6,222,920 B1 | 4/2001 | Walker et al. | |
| 6,330,327 B1 | 12/2001 | Lee et al. | |
| 6,373,940 B2 * | 4/2002 | Shaffer et al. | 379/355.02 |
| 6,389,028 B1 | 5/2002 | Bondarenko et al. | |
| 6,556,662 B1 | 4/2003 | Miller et al. | |
| 6,608,890 B1 | 8/2003 | Schulz et al. | |
| 6,631,187 B1 | 10/2003 | Juhola et al. | |
| 6,825,276 B2 | 11/2004 | Brown et al. | |
| 6,856,678 B2 | 2/2005 | Catley et al. | |
| 6,904,138 B1 | 6/2005 | Loebig | |
| 6,959,081 B2 | 10/2005 | Brown et al. | |
| 7,020,256 B2 | 3/2006 | Jain et al. | |
| 7,050,567 B1 | 5/2006 | Jensen | |
| 7,050,568 B2 | 5/2006 | Brown et al. | |

(Continued)

OTHER PUBLICATIONS

USPTO office action for U.S. Appl. No. 11/538,879 dated May 27, 2010.

(Continued)

*Primary Examiner* — Lisa Hashem
(74) *Attorney, Agent, or Firm* — Yee & Associates, P.C.; Mark C. Vallone

(57) ABSTRACT

A system for broadcasting a notification. In response to receiving a new telephone number for a communication device from a service provider, a telephone number change notification is automatically broadcast to a plurality of contact telephone numbers within a contact list. Each of the plurality of contact telephone numbers within the contact list is tracked to determine whether each of the plurality of contact telephone numbers received the telephone number change notification. In response to a contact telephone number within the plurality of contact telephone numbers not receiving the telephone number change notification, a configurable indicator is displayed in a display when a user inputs the contact telephone number into the communication device.

12 Claims, 2 Drawing Sheets

U.S. PATENT DOCUMENTS

| | | |
|---|---|---|
| 7,095,842 B2 | 8/2006 | Brown et al. |
| 7,130,411 B2 | 10/2006 | Brown et al. |
| 7,162,514 B2 * | 1/2007 | Hirai .............................. 709/206 |
| 7,233,651 B2 | 6/2007 | Bull et al. |
| 7,251,318 B1 | 7/2007 | Henderson |
| 7,437,413 B2 * | 10/2008 | Okuyama et al. ............. 709/206 |
| 7,533,418 B1 * | 5/2009 | Yoakum et al. .................. 726/26 |
| 7,606,351 B2 * | 10/2009 | Niwa .......................... 379/88.12 |
| 7,664,242 B2 | 2/2010 | Finkelman et al. |
| 7,877,083 B2 | 1/2011 | Chen et al. |
| 7,881,701 B2 | 2/2011 | Chen et al. |
| 2002/0132615 A1 * | 9/2002 | Narusawa ..................... 455/415 |
| 2003/0103618 A1 | 6/2003 | Brown et al. |
| 2003/0108185 A1 | 6/2003 | Brown et al. |
| 2003/0108186 A1 | 6/2003 | Brown et al. |
| 2003/0174830 A1 | 9/2003 | Boyer et al. |
| 2004/0137923 A1 * | 7/2004 | Lang .............................. 455/466 |
| 2004/0170258 A1 * | 9/2004 | Levin et al. ................. 379/88.01 |
| 2005/0125344 A1 * | 6/2005 | Utsumi ........................... 705/39 |
| 2005/0254636 A1 * | 11/2005 | Niwa ............................ 379/156 |
| 2006/0126810 A1 | 6/2006 | Wilson et al. |
| 2006/0239434 A1 | 10/2006 | Acharya |
| 2006/0273920 A1 | 12/2006 | Doan et al. |
| 2007/0291925 A1 | 12/2007 | Goldman et al. |
| 2008/0188202 A1 * | 8/2008 | Maeng ....................... 455/412.1 |
| 2008/0260138 A1 | 10/2008 | Chen et al. |
| 2008/0304647 A1 * | 12/2008 | Ikemori et al. ........... 379/207.02 |
| 2009/0017806 A1 * | 1/2009 | Hayakawa et al. ............ 455/415 |
| 2009/0092233 A1 * | 4/2009 | Meli et al. ................. 379/88.11 |
| 2010/0042674 A1 * | 2/2010 | Pantalone et al. ............. 709/203 |
| 2010/0120453 A1 * | 5/2010 | Tamchina et al. ............. 455/466 |
| 2010/0138441 A1 * | 6/2010 | Ryu ............................... 707/769 |
| 2010/0153886 A1 * | 6/2010 | Hautala ......................... 715/847 |
| 2010/0255885 A1 * | 10/2010 | Lee ............................... 455/566 |
| 2011/0029547 A1 * | 2/2011 | Jeong et al. .................... 707/758 |
| 2011/0034156 A1 * | 2/2011 | Gatti et al. ..................... 455/415 |
| 2011/0053570 A1 * | 3/2011 | Song et al. .................. 455/414.1 |
| 2011/0053573 A1 * | 3/2011 | Takeoka et al. ............... 455/418 |
| 2011/0086648 A1 * | 4/2011 | Cho et al. ...................... 455/466 |

OTHER PUBLICATIONS

USPTO office action for U.S. Appl. No. 11/553,085 dated May 27, 2010.
USPTO office action for U.S. Appl. No. 11/736,702 dated Sep. 29, 2010.
USPTO notice of allowance for U.S. Appl. No. 11/736,702 dated Mar. 8, 2011.
USPTO notice of allowance for U.S. Appl. No. 11/538,879 dated Sep. 21, 2010.
USPTO notice of allowance for U.S. Appl. No. 11/553,085 dated Sep. 16, 2010.
USPTO office action for U.S. Appl. No. 11/558,600 dated Sep. 2, 2010.
USPTO notice of allowance for U.S. Appl. No. 11/558,600 dated Jan. 5, 2011.

* cited by examiner

US 8,041,024 B2

METHOD AND SYSTEM FOR TELEPHONE NUMBER CHANGE NOTIFICATION AND TRACKING

BACKGROUND OF THE INVENTION

1. Field of the Invention

The present invention relates generally to an improved communication device. More specifically, the present invention is directed to a computer implemented method and computer usable program code in a communication device for automatically notifying a plurality of contacts of a telephone number change and tracking actions taken by each of the plurality of contacts in response to receiving the notification of the telephone number change.

2. Description of the Related Art

Innovations in communications technologies have made a wide range of enhanced communications services available to a user. For example, a user may dial a telephone number at the press of a key by using speed-dialing, retrieve a telephone number for a missed call, view a telephone number of an incoming call on a display by using caller identification (caller ID), and send or retrieve a voice message by using voice mail. A communications provider often provides these services through a network such as an intelligent services network (ISN) that is privately owned but that works in conjunction with the public switched telephone network (PSTN). These services also may be offered by a dedicated device, such as a telephone with advanced electronics or a telephone answering machine, located at the user's premises.

However, one problem associated with current communications technologies is that there is no way for a user of a communication device to automatically inform all the contacts contained within a contact list of a telephone number change for the user's communication device. Presently, after changing the telephone number of a communication device, a user may become concerned that contacts within the user's contact list may not be aware of the telephone number change. Consequently, the user worries about missing important telephone calls from contacts that are not aware of the telephone number change. Currently, because there is no way to automatically notify contacts of the telephone number change, the user must individually dial each telephone number in the contact list to disseminate the new telephone number to the contacts. This process of manually dialing all the telephone numbers in the contact list is very tedious and time consuming.

In addition, the user may not immediately connect with a contact on the first try. As a result, the user may leave a voice message in a voice mailbox or on an answering machine message, but only if either of these two options is available. If the user is not able to leave a voice message, or simply does not want to leave a voice message, the user must remember to call that contact again later. Further, if the user is able to leave a voice message regarding the telephone number change, the user has no way of knowing whether the contact received the voice message or if the contact wants the new number.

Therefore, it would be beneficial to have an improved computer implemented method and computer usable program code in a communication device for automatically notifying a plurality of contacts of a telephone number change and tracking actions taken by each of the plurality of contacts in response to receiving the notification of the telephone number change.

SUMMARY OF THE INVENTION

Illustrative embodiments provide a computer implemented method and computer usable program code in a communication device for broadcasting a notification. In response to receiving a new telephone number for the communication device from a service provider, a telephone number change notification is automatically broadcast to a plurality of contact telephone numbers within a contact list. Each of the plurality of contact telephone numbers within the contact list is tracked to determine whether each of the plurality of contact telephone numbers received the telephone number change notification. In response to a contact telephone number within the plurality of contact telephone numbers not receiving the telephone number change notification, a configurable indicator is displayed in a display when a user inputs the contact telephone number into the communication device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
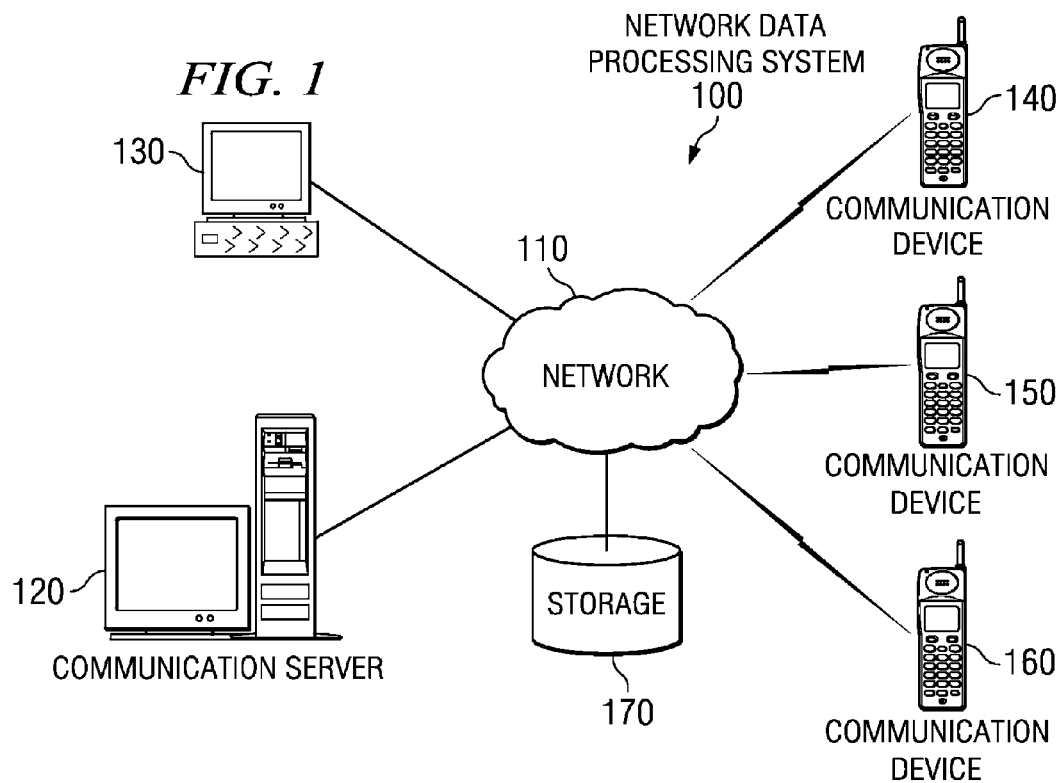
FIG. 1 is a pictorial representation of a network of data processing systems in which illustrative embodiments may be implemented.

With reference now to the figures, FIG. 1 depicts a pictorial representation of a network of data processing systems in which illustrative embodiments may be implemented. Network data processing system 100 is a network of computers and devices in which illustrative embodiments may be implemented. Network data processing system 100 contains network 110, which is the medium used to provide communication links between various devices and computers coupled together within network data processing system 100. Network 110 may include several types of connections, such as wire, wireless communication links, or fiber optic cables. However, for this illustrative embodiment depicted in FIG. 1, wireless communication links are emphasized.

In the depicted example of FIG. 1, server 120 is coupled to network 110 by wire or wireless communication links. Server 120 may, for example, be a communication server with high speed connections to network 110. Also, server 120 may represent a plurality of communication servers located within a local area network (LAN) or a wide area network (WAN). Further, communication server 120 may, for example, reside within a cellular telephone service provider (SP) network. In another illustrative embodiment, communication server 120 may, for example, independently provide communication services for a plurality of cellular telephone service provider networks.

Communication devices 130, 140, 150, and 160, along with storage unit 170, also are coupled to network 110 via wire or wireless links. In addition, communication devices 130, 140, 150, and 160 are clients to communication server 120. In this illustrative example, communication device 130 is a personal computer using a conventional land line communication link and communication devices 140, 150, and 160 are cellular telephones relying on wireless communication links.

However, it should be noted that besides being personal computers and cellular telephones, the communication devices shown in FIG. 1 may, for example, be personal digital assistants (PDAs), handheld computers, laptop computers, larger data processing systems, other communication servers, or any combination thereof. Furthermore, illustrative embodiments are not restricted to the above-listed communication devices. Illustrative embodiments may utilize any communication device that is capable of accomplishing processes of illustrative embodiments.

Storage unit 170 represents any type of storage device that is capable of storing data in a structured and/or unstructured format. Also, storage unit 170 may represent a plurality of storage units coupled to network 110. Storage unit 170 may, for example, be a database for a cellular telephone SP network that contains customer information, such as name, telephone number, customer identification number, and indicators for when telephone numbers are changed. However, it should be noted that storage unit 170 may contain any data necessary for processes of illustrative embodiments to automatically notify a plurality of contacts of a telephone number change and track actions taken by each of the plurality of contacts in response to receiving the notification of the telephone number change.

Additionally, network data processing system 100 may, for example, include additional servers, clients, storage units, and other devices not shown. Moreover, network data processing system 100 may, for example, represent the Internet with network 110 representing a worldwide collection of networks and gateways that use the transmission control protocol/internet protocol (TCP/IP) suite of protocols to communicate with one another. At the heart of the Internet is a backbone of high-speed data communication lines between major nodes or host computers, consisting of thousands of commercial, government, educational and other computer systems that route data and messages.

It should be appreciated by those of ordinary skill in the art that FIG. 1 is only intended as an exemplary illustration and is not intended as an architectural limitation for illustrative embodiments. Further, it should be appreciated by those of ordinary skill in the art that even though the example of FIG. 1 depicts a telephone network, illustrative embodiments may, for example, be utilized in an e-mail network, an instant messaging network, or any other network system that requires connection data, such as e-mail addresses, instant messaging screen names, and the like. Thus, illustrative embodiments may be utilized to automatically notify a plurality of contacts of an e-mail address or instant messaging screen name change and track actions taken by each of the plurality of contacts in response to receiving the notification of the e-mail address or instant messaging screen name change.

Illustrative embodiments provide a computer implemented method and computer usable program code in a communication device for automatically broadcasting a telephone number change notification. In response to receiving a new telephone number from a service provider, a broadcast and tracking unit automatically broadcasts the telephone number change notification to a plurality of contact telephone numbers within a contact list. It should be noted that illustrative embodiments are not restricted to only network communication between devices but also may include peer-to-peer communication as well. The telephone number change notification includes the new telephone number for the communication device.

After broadcasting the telephone number change notification, the broadcast and tracking unit tracks whether each of the plurality of contact telephone numbers within the contact list received the telephone number change notification and tracks actions taken by each of the plurality of contact telephone numbers. Subsequently, the broadcast and tracking unit displays a configurable indicator, such as, for example, different color display backgrounds, characters, markers, or textual messages, within a display when a user inputs a contact telephone number from within the plurality of contact telephone numbers into the communication device based on whether the contact telephone number received the telephone number change notification and the action taken. In other words, the configurable indicator is a visual indication within the display of the communication device to alert the user of different events that have occurred after broadcasting the telephone number change notification. The user may configure or select, for example, which color, character, marker, or textual message is used to indicate the different events. Alternatively, the user may utilize default settings for the configurable indicator to visually indicate the different events. Actions taken by the contact may include saving the new telephone number contained within the telephone number change notification, deleting the new telephone number contained within the telephone number change notification, and not taking action on the new telephone number contained within the telephone number change notification.

Further, a user may prompt the communication device to display a status report of the telephone number change notification. The status report may, for example, list all contacts within the contact list notified of the telephone number change and the action taken by each contact. Similarly, a contact utilizing a communication device equipped with an illustrative embodiment may prompt the communication device to display a history report. The history report may, for example, include all automatically or manually processed telephone number change notifications, updates, and actions taken. Furthermore, a user using an illustrative embodiment may enable a reminder/alert function to remind the user to take an action, such as notify a previously missed contact.

A user utilizing a communication device that includes an illustrative embodiment will save time, effort, and frustration in notifying all the contacts within the contact list of a telephone number change for the communication device. Thus, a user's satisfaction is increased by utilizing illustrative embodiments because the new telephone number for the communication device is automatically broadcast to each contact within the contact list. In addition, each contact within the contact list is automatically tracked for whether each contact received the notification of telephone number change and actions taken by each contact in response to the notification.

Figure 2A:
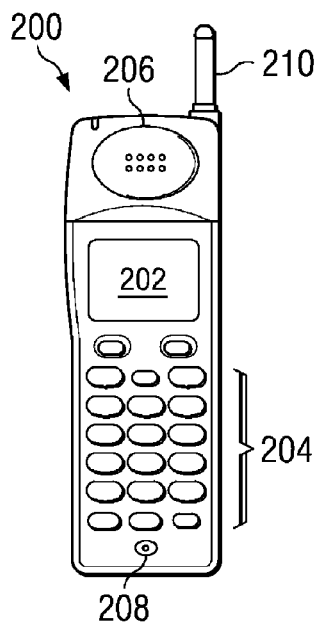
FIG. 2A is a pictorial representation of a communication device in which illustrative embodiments may be implemented.

With reference now to FIG. 2A, a pictorial representation of a communication device is depicted in which illustrative embodiments may be implemented. In the illustrative example of FIG. 2A, communication device 200 is a cellular telephone. However, illustrative embodiments may utilize any type of communication device to accomplish processes of illustrative embodiments. Communication device 200 may, for example, be communication device 140 in FIG. 1.

Communication device 200 includes display 202 to present textual and graphical information to a user. Display 202 is capable of presenting the textual and graphical information in a plurality of colors. In addition, display 202 may present the background within display 202 in a plurality of different colors from the textual and graphical information displayed. Display 202 may be a known display device, such as a liquid crystal display (LCD).

Communication device 200 also includes keypad 204, speaker 206, and microphone 208. Keypad 204 may be utilized to enter telephone numbers, user identification information, and commands for interacting with the interface. Audio feedback may be presented via speaker 206. Microphone 208 may be used not only for voice communication, but also for entering specific voice commands for voice actuated functions. Further, communication device 200 uses antenna 210 to establish wireless communication links with a network, such as, for example, network 110 in FIG. 1. However, it should be noted that even though antenna 210 is shown as an external antenna in FIG. 2A, antenna 210 may represent an internal antenna as well.

Figure 2B:
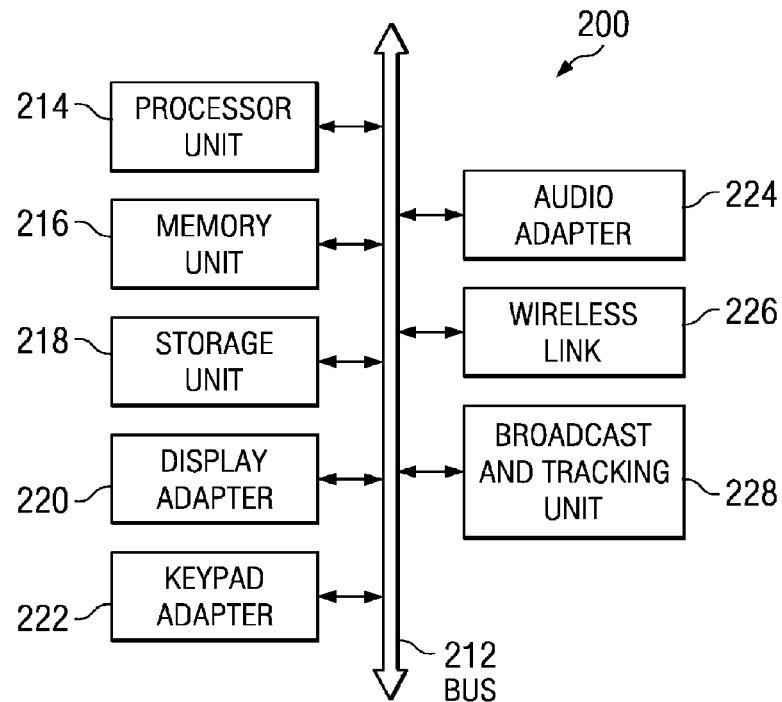
FIG. 2B is a block diagram of a communication device in accordance with an illustrative embodiment.

With reference now to FIG. 2B, a block diagram of a communication device is depicted in accordance with an illustrative embodiment. In the illustrative example of FIG. 2B, communication device 200 utilizes a bus architecture, such as bus 212. Bus 212 may include one or more buses. In addition, bus 212 may be implemented using any type of communication fabric or architecture that provides for a transfer of data between the different components or devices coupled to bus 212.

Communication device 200 includes processor unit 214, memory unit 216, storage unit 218, display adapter 220, keypad adapter 222, audio adapter 224, wireless link 226, and broadcast and tracking unit 228 connected to bus 212. However, it should be noted that communication device 200 is only shown for exemplary purposes and is not meant as an architectural limitation to illustrative embodiments. Communication device 200 may include more or fewer components as necessary to perform processes of illustrative embodiments.

Processor unit 214 provides the data processing capabilities of communication device 200. An operating system runs on processor unit 214 and coordinates and provides control of various components within communication device 200. In addition, software applications executing on communication device 200 may run in conjunction with the operating system.

Storage unit 218 is a non-volatile memory or storage device that may, for example, be configured as read only memory (ROM) and/or flash ROM to provide the non-volatile memory for storing the operating system and/or user-generated data. Storage unit 218 stores instructions or computer usable program code for the operating system and applications. The instructions are loaded into memory unit 216 for execution by processor unit 214. Processor unit 214 performs processes of illustrative embodiments by executing the computer usable program code that is loaded into memory unit 216.

The user-generated data stored within storage unit 218 may, for example, be contact names, addresses, descriptions, telephone numbers, e-mail addresses, screen names, and the like. A contact is a person or entity that a user wishes to communicate with via communication device 200. This user-generated data of contact names, telephone numbers, e-mail addresses, and instant messaging screen names may be placed within a contact list. A contact list is a list of all the contacts the user inputs and stores within storage unit 218. It should be noted that the user may enable communication device 200 to automatically store contact information within the contact list when a contact connects with communication device 200.

In addition, it should be noted that a contact list may only contain a subset of all the contacts stored within storage unit 218, such as, for example, a family, friends, co-workers, businesses, and general contact list. As a result, storage unit 218 may contain one or more contact lists for communication device 200. Further, communication device 200 may store this user-generated data in a remote storage device, such as, for example, storage 170 in FIG. 1, in addition to or instead of storage unit 218.

Wireless link 226 may, for example, utilize shortwave, high frequency, ultra high frequency, microwave, wireless fidelity (Wi-Fi), Bluetooth, or any other wireless communication means to establish a wireless communication link for communication device 200. Communication device 200 also may rely on wireless application protocol (WAP) for facilitating communications. Wireless application protocol is a standard for providing wireless phones, pagers and other handheld devices with secure access to e-mail and text-based Web pages. Wireless application protocol provides a complete environment for wireless applications that includes a wireless counterpart of TCP/IP and a framework for telephony integration such as call control and phone book access. Wireless application protocol features the wireless markup language (WML), which was derived from Phone.com's handheld device markup language (HDML) and is a streamlined version of hypertext markup language (HTML) for small screen displays. Also, wireless application protocol uses WML-Script, a compact JavaScript-like language that runs in limited memory. Additionally, wireless application protocol supports handheld input methods such as keypad and voice recognition.

Wireless application protocol runs over all the major wireless networks now in place. Also, wireless application protocol is device independent, requiring only a minimum functionality in the unit so that it may be used with a myriad of cellular phones and handheld devices. However, it should be pointed out that wireless application protocol has been described for illustrative purposes, and other wireless protocols may be used to implement illustrative embodiments.

Communication device 200 uses broadcast and tracking unit 228 to automatically broadcast a telephone number change notification to all contacts within the contact list. Alternatively, the user may manually select which contacts within the contact list(s) are sent a telephone number change notification. The automatic broadcast notification includes the new telephone number of communication device 200 and the user's name. However, it should be noted that illustrative embodiments may include more or less information within the telephone number change notification necessary to inform the contact of the telephone number change and the identity of the associated user. Furthermore, the automatic broadcast notification may be a text message, a voice message, or a combination of both. This automatic notification process may, for example, be performed during non-peak cellular telephone SP network hours in the background. Moreover, broadcast and tracking unit 228 may, for example, automatically rebroadcast the telephone number change notification on a predetermined periodic basis, such as hourly, daily, weekly, or monthly, to contacts within the contact list(s) not previously connected with.

In addition, communication device 200 uses broadcast and tracking unit 228 to automatically track whether each contact within the contact list(s) received the telephone number change notification. Further, communication device 200 uses broadcast and tracking unit 228 to automatically track actions taken by each of the contacts in response to receiving the telephone number change notification. Actions taken by the contact in response to receiving the telephone number change notification may, for example, include saving the new telephone number, deleting the old telephone number, deleting the new telephone number, or taking no action on the new telephone number.

In response to the actions taken by each of the contacts after receiving the telephone number change notification, broadcast and tracking unit 228 may, for example, change the background of display 202 to a different color depending upon the action taken by the contact. For example, when the user of communication device 200 dials a contact's telephone number after the broadcast of the telephone number change notification, broadcast and tracking unit 228 changes the background of display 202 to green if the contact received the telephone number change notification and saved the new telephone number, to yellow if the contact received the telephone number change notification but did not any action on the new telephone number, to red if the contact did not receive the telephone number change notification, or to black if the contact received the telephone number change notification but deleted the new telephone number.

However, it should be noted that the user may configure communication device 200 to change the background of display 202 to any desired color to indicate the different actions taken by the contact in response to the telephone number change notification. Also, illustrative embodiments are not limited to changing display background colors to indicate actions taken by contacts in response to receiving the telephone number change notification. Illustrative embodiments may, for example, display different characters or markers within display 202 to indicate the different actions taken by the contact, emit different sound tones from speaker 206, or any combination of the options mentioned above.

Also, the user of communication device 200 may enable broadcast and tracking unit 228 to automatically update the user-generated data within storage unit 218 if communication device 200 receives a telephone number change notification from a contact using an illustrative embodiment and display, for example, a blue background within display 202 to indicate the automatic update. Similarly, a contact using a communication device equipped with an illustrative embodiment may enable the communication device to automatically update the contact's contact list with the new telephone number contained within the telephone number change notification and to make the appropriate background color change.

Further, it should be noted that a user of communication device 200 may enable and disable broadcast and tracking unit 228 independently of other communication device 200 functions and features. Furthermore, it should be noted that broadcast and tracking unit 228 may be implemented entirely as software, hardware, or as a combination of software and hardware components.

Those of ordinary skill in the art will appreciate that the hardware in FIG. 2A and FIG. 2B may vary depending on implementation of illustrative embodiments. Other internal hardware or peripheral devices may be used in addition to or in place of the hardware depicted in FIG. 2A and FIG. 2B. For example, communication device 200 also may include a voice recognition system in order to perform functions activated by user voice command.

Figure 3:
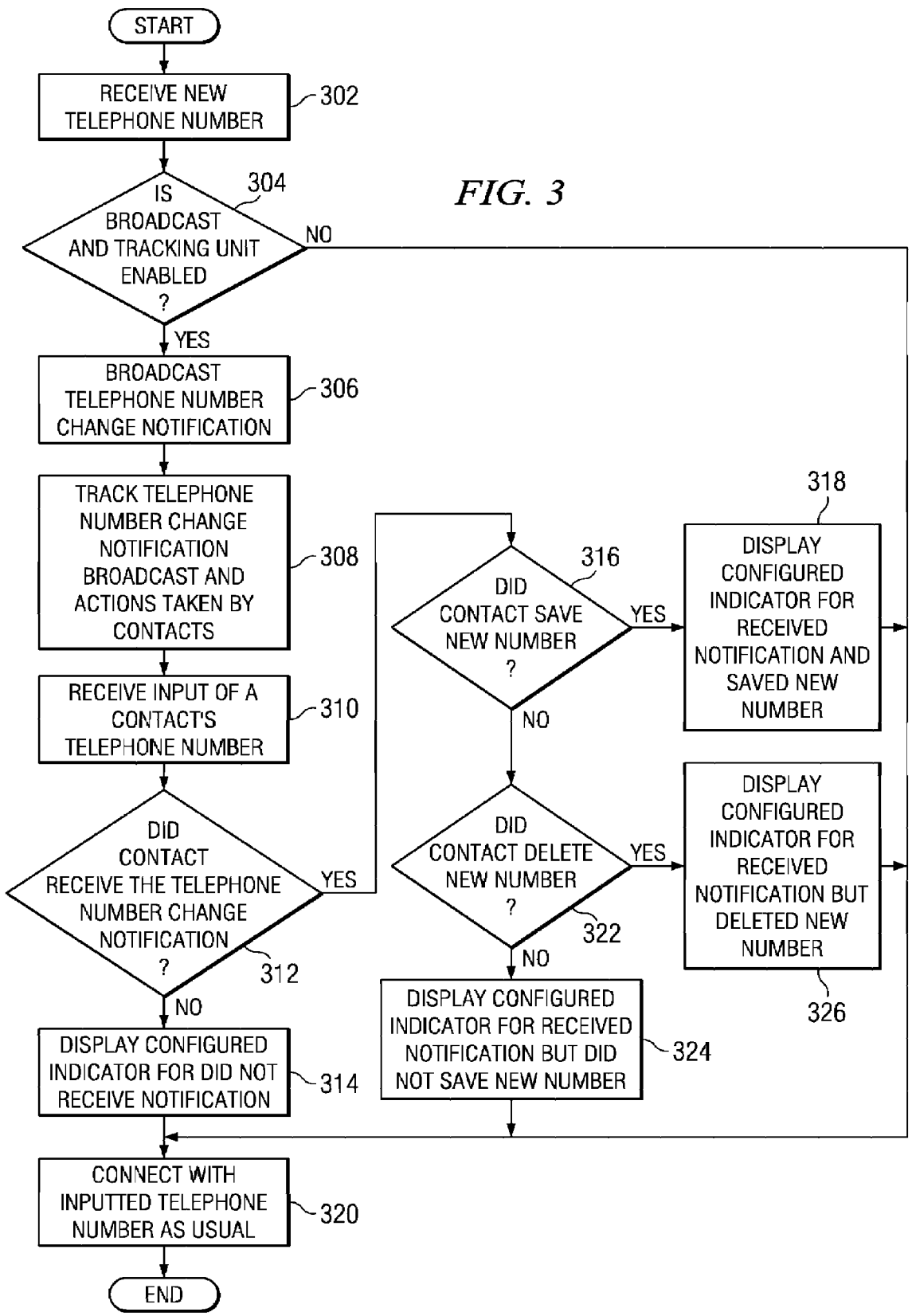
FIG. 3 is a flowchart illustrating an exemplary process for automatically broadcasting a telephone number change notification to contacts within a contact list and tracking actions taken by the contacts in response to receiving the telephone number change notification in accordance with an illustrative embodiment.

With reference now to FIG. 3, a flowchart illustrating an exemplary process for automatically broadcasting a telephone number change notification to contacts within a contact list and tracking actions taken by the contacts in response to receiving the telephone number change notification is shown in accordance with an illustrative embodiment. The process shown in FIG. 3 may be implemented in a communication device, such as, for example, communication device 200 in FIGS. 2A and 2B.

The process begins when a communication device, such as, for example, communication device 200 in FIG. 2, receives a new telephone number from a cellular telephone SP network communication server, such as, for example, communication server 120 in FIG. 1 (step 302). After receiving the new telephone number in step 302, the communication device makes a determination as to whether a broadcast and tracking unit, such as, for example, broadcast and tracking unit 228 in FIG. 2, is enabled (step 304). If the broadcast and tracking unit is not enabled, no output of step 304, then the process proceeds to step 320 where the communication device connects with inputted telephone numbers as usual.

If the broadcast and tracking unit is enabled, yes output of step 304, then the communication device uses the broadcast and tracking unit to automatically broadcast a telephone number change notification to each contact within a contact list (step 306). Alternatively, the communication device may provide a user with an option to select which contacts within the contact list to broadcast the telephone number change notification to. The broadcast and tracking unit may perform the automatic broadcast of the telephone number change notification during non-peak cellular telephone SP network hours. Subsequent to broadcasting the telephone number change notification in step 306, the broadcast and tracking unit tracks whether each contact within the contact list received the telephone number change notification and tracks the action taken by each contact in response to receiving the telephone number change notification (step 308).

After the broadcast and tracking unit tracks whether each contact within the contact list received the telephone number change notification and the action taken by each contact in response to receiving the telephone number change notification in step 308, the communication device receives a telephone number input for a contact within the contact list (step 310). Subsequent to receiving the telephone number input for the contact in step 310, the broadcast and tracking unit makes a determination as to whether the contact received the telephone number change notification (step 312). If the contact did not receive the telephone number change notification, no output of step 312, then the broadcast and tracking unit displays a configurable indicator indicating that the contact did not receive the telephone number change notification (step 314). For example, the configurable indicator may be a red background in a display, such as display 202 in FIG. 2, when the contact did not receive the telephone number change notification.

Of course, illustrative embodiments are not restricted to the use of colored backgrounds as a configurable indicator. Illustrative embodiments may utilize other configurable indicators, such as, for example, different characters, marks, text, or any combination thereof, within the display. After the broadcast and tracking unit displays the configurable indicator for when the contact did not receive the telephone number change notification in step 314, the process proceeds to step 320 where the communication device connects with the inputted telephone number in step 310 as usual.

Returning now to step 312, if the contact did receive the telephone number change notification, yes output of step 312, then the broadcast and tracking unit makes a determination as to whether the contact saved the new telephone number contained in the telephone number change notification (step 316). If the contact did save the new telephone number, yes output of step 316, then the broadcast and tracking unit displays a configurable indicator indicating that the contact did receive the telephone number change notification and did save the new telephone number (step 318). For example, the configurable indicator may be a green background in the display when the contact did receive the telephone number change notification and did save the new telephone number. After the broadcast and tracking unit displays the configured indicator for when the contact did receive the telephone number change notification and did save the new telephone number in step 318, the communication device connects with the inputted telephone number in step 310 as usual (step 320). The process terminates thereafter.

Returning now to step 316, if the contact did not save the new telephone number, no output of step 316, then the broadcast and tracking unit makes a determination as to whether the contact deleted the new telephone number (step 322). If the contact did not delete the new telephone number, no output of step 322, then the broadcast and tracking unit displays a configurable indicator indicating that the contact did receive the telephone number change notification but did not save the new telephone number (step 324). For example, the configurable indicator may be a yellow background in the display when the contact did receive the telephone number change notification but did not save the new telephone number. After the broadcast and tracking unit displays the configurable indicator for when the contact receives the telephone number change notification but did not save the new telephone number in step 324, the process returns to step 320 where the communication device connects with the inputted telephone number in step 310 as usual.

Returning now to step 322, if the contact did delete the new telephone number, yes output of step 322, then the broadcast and tracking unit displays a configurable indicator indicating that the contact did receive the telephone number change notification but deleted the new telephone number (step 326). For example, the configurable indicator may be a black background in the display when the contact did receive the telephone number change notification but deleted the new telephone number. After the broadcast and tracking unit displays the configured indicator for when the contact did receive the telephone number change notification but deleted the new telephone number in step 326, the process returns to step 320 where the communication device connects with the inputted telephone number in step 310 as usual.

Thus, illustrative embodiments provide a computer implemented method, system, and computer usable program code in a communication device for automatically notifying a plurality of contacts within a contact list of a telephone number change for a communication device and tracking actions taken by each of the plurality of contacts in response to receiving the notification of the telephone number change. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic or semiconductor system (or apparatus or device). Examples of a computer-readable medium include a semiconductor or solid state memory, magnetic tape, a removable computer diskette, a random access memory (RAM), a ROM, a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a sending communication device for broadcasting a notification, the method comprising:

responsive to receiving a new telephone number for the sending communication device from a service provider, automatically broadcasting, by the sending communication device, a telephone number change notification to a plurality of contact telephone numbers within a contact list;

tracking, by the sending communication device, whether each of the plurality of contact telephone numbers within the contact list received the telephone number change notification;

responsive to a contact telephone number within the plurality of contact telephone numbers being dialed by a user of the sending communication device, determining, by the sending communication device, whether the dialed telephone number received the telephone number change notification;

responsive to a determination that the dialed telephone number within the plurality of contact telephone numbers received the telephone number change notification, determining, by the sending communication device, an action taken by a contact associated with the dialed telephone number in response to the telephone number change notification being received; and displaying, by the sending communication device, a different color in a background of a display when the user inputs the contact telephone number into the sending communication device based on whether the dialed telephone number received the telephone number change notification and the action taken by the contact associated with dialed telephone number, wherein the sending communication device changes the background of the display to a first different color in response to a determination that the dialed telephone number received the telephone number change notification and the contact associated with the dialed telephone number saved the new telephone number, changes the background of the display to a second different color in response to a determination that the dialed telephone number received the telephone number change notification and the contact associated with the dialed telephone number took no action with regard to the new telephone number, changes the background of the display to a third different color in response to a determination that the dialed telephone number received the telephone number change notification and the contact associated with the dialed telephone number deleted the new telephone number, and changes the background of the display to a fourth different color in response to a determination that the dialed telephone number did not receive the telephone number change notification.

2. The computer implemented method of claim 1, wherein the telephone number change notification includes the new telephone number for the sending communication device.

3. The computer implemented method of claim 1, wherein the telephone number change notification is automatically broadcasting, by the sending communication device, to the plurality of contact telephone numbers within the contact list during non-peak network hours in a background when the sending communication device is not in use.

4. The computer implemented method of claim 1, wherein the telephone number change notification is automatically rebroadcast, by the sending communication device, on a predetermined time interval basis to contact telephone numbers within the plurality of contact telephone numbers that did not previously receive the telephone number change notification.

5. A computer program product for broadcasting a notification, the computer program product comprising:
a computer usable storage medium having computer usable program code embodied therein, the computer usable storage medium comprising:
computer usable program code configured to automatically broadcast, by a sending communication device, a telephone number change notification to a plurality of contact telephone numbers within a contact list in response to receiving a new telephone number for the sending communication device from a service provider;
computer usable program code configured to track, by the sending communication device, whether each of the plurality of contact telephone numbers within the contact list received the telephone number change notification;
computer usable program code configured to determine, by the sending communication device, whether a dialed telephone number received the telephone number change notification in response to a contact telephone number within the plurality of contact telephone numbers being dialed by a user of the sending communication device;
computer usable program code configured to determine, by the sending communication device, an action taken by a contact associated with the dialed telephone number in response to a determination that the dialed telephone number within the plurality of contact telephone numbers received the telephone number change notification; and
computer usable program code configured to display, by the sending communication device, a different color in a background of a display when the user inputs the contact telephone number into the sending communication device based on whether the dialed telephone number received the telephone number change notification and the action taken by the contact associated with dialed telephone number, wherein the sending communication device changes the background of the display to a first different color in response to a determination that the dialed telephone number received the telephone number change notification and the contact associated with the dialed telephone number saved the new telephone number, changes the background of the display to a second different color in response to a determination that the dialed telephone number received the telephone number change notification and the contact associated with the dialed telephone number took no action with regard to the new telephone number, changes the background of the display to a third different color in response to a determination that the dialed telephone number received the telephone number change notification and the contact associated with the dialed telephone number deleted the new telephone number, and changes the background of the display to a fourth different color in response to a determination that the dialed telephone number did not receive the telephone number change notification.

6. The computer program product of claim 5, wherein the telephone number change notification includes the new telephone number for the sending communication device.

7. The computer program product of claim 5, wherein the telephone number change notification is automatically broadcasting, by the sending communication device, to the plurality of contact telephone numbers within the contact list during non-peak network hours in a background when the sending communication device is not in use.

8. The computer program product of claim 5, wherein the telephone number change notification is automatically rebroadcast, by the sending communication device, on a predetermined time interval basis to contact telephone numbers within the plurality of contact telephone numbers that did not previously receive the telephone number change notification.

9. A sending communication device for broadcasting a notification, the sending communication device comprising:
a bus;
a storage device connected to the bus, wherein the storage device stores instructions; and
a processor unit connected to the bus, wherein the processor unit executes the instructions to automatically broadcast, by the sending communication device, a telephone number change notification to a plurality of contact telephone numbers within a contact list in response to receiving a new telephone number for the sending communication device from a service provider; track, by the sending communication device, whether each of the plurality of contact telephone numbers within the contact list received the telephone number change notification; determine, by the sending communication device, whether a dialed telephone number received the telephone number change notification in response to a contact telephone number within the plurality of contact telephone numbers being dialed by a user of the sending communication device; determine, by the sending communication device, an action taken by a contact associated with the dialed telephone number in response to a determination that the dialed telephone number within the plurality of contact telephone numbers received the telephone number change notification; and display, by the sending communication device, a different color in a background of a display when the user inputs the contact telephone number into the sending communication device based on whether the dialed telephone number received the telephone number change notification and the action taken by the contact associated with dialed telephone number, wherein the sending communication device changes the background of the display to a first different color in response to a determination that the dialed telephone number received the telephone number change notification and the contact associated with the dialed telephone number saved the new telephone number, changes the background of the display to a second different color in response to a determination that the dialed telephone number received the telephone number change notification and the contact associated with the dialed telephone number took no action with regard to the new telephone number, changes the background of the display to a third different color in response to a determination that the dialed telephone number received the telephone number change notification and the contact associated with the dialed telephone number deleted the new telephone number, and changes the background of the display to a fourth different color in response to a determination that the dialed telephone number did not receive the telephone number change notification.

10. The sending communication device of claim 9, wherein the telephone number change notification includes the new telephone number for the sending communication device.

11. The sending communication device of claim 9, wherein the telephone number change notification is automatically broadcasting, by the sending communication device, to the plurality of contact telephone numbers within the contact list during non-peak network hours in a background when the sending communication device is not in use.

12. The sending communication device of claim 9, wherein the telephone number change notification is automatically rebroadcast, by the sending communication device, on a predetermined time interval basis to contact telephone numbers within the plurality of contact telephone numbers that did not previously receive the telephone number change notification.

* * * * *